April 11, 1944.  M. G. WRIGHT  2,346,406
GAUGE
Filed July 5, 1943   3 Sheets-Sheet 1

Inventor
Manfred G. Wright
By Blackmore, Spencer & Hunt
Attorneys

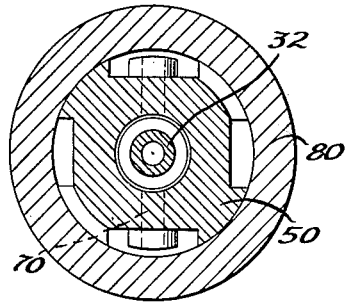
Fig. 8
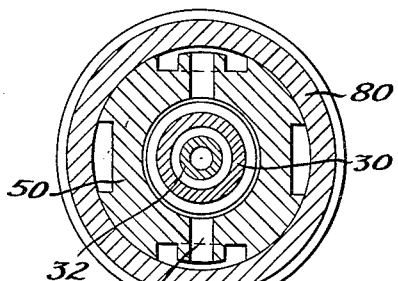
Fig. 9
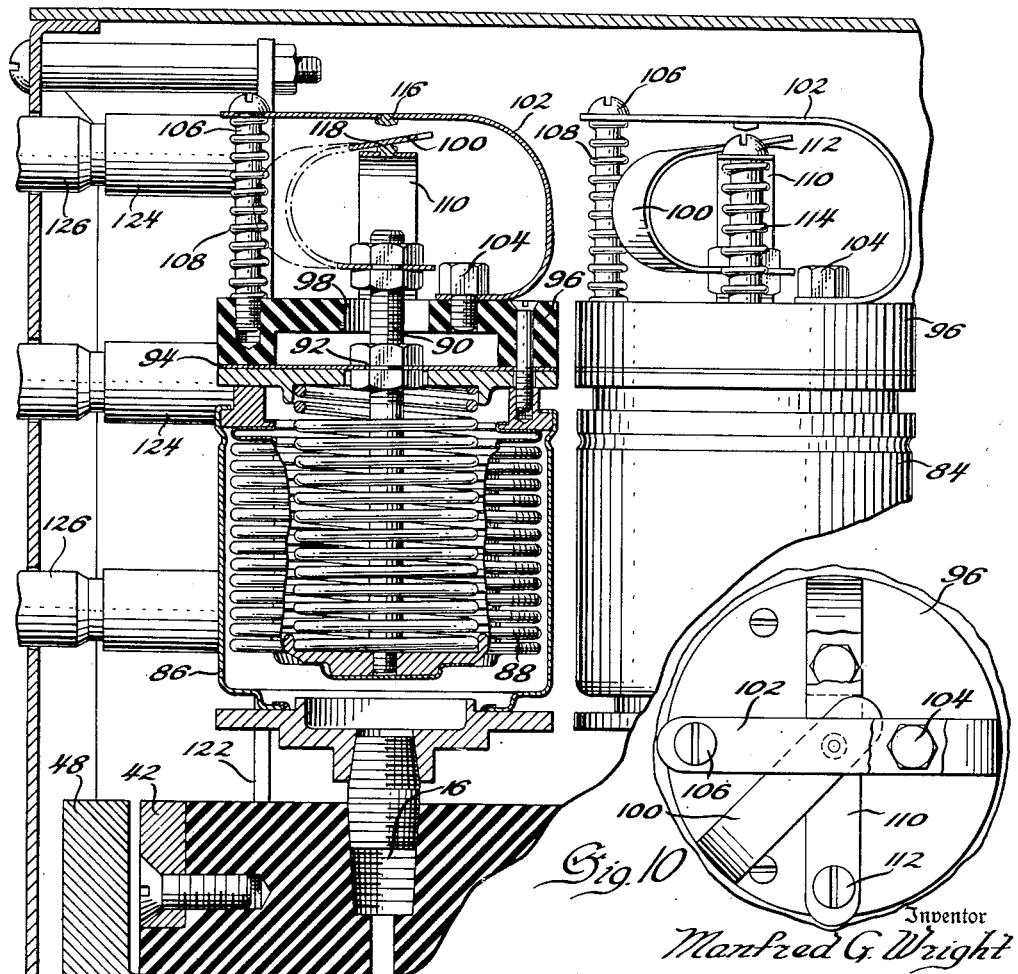
Fig. 4
Fig. 10
Inventor
Manfred G. Wright
By Blackmore, Spencer & Flint
Attorneys

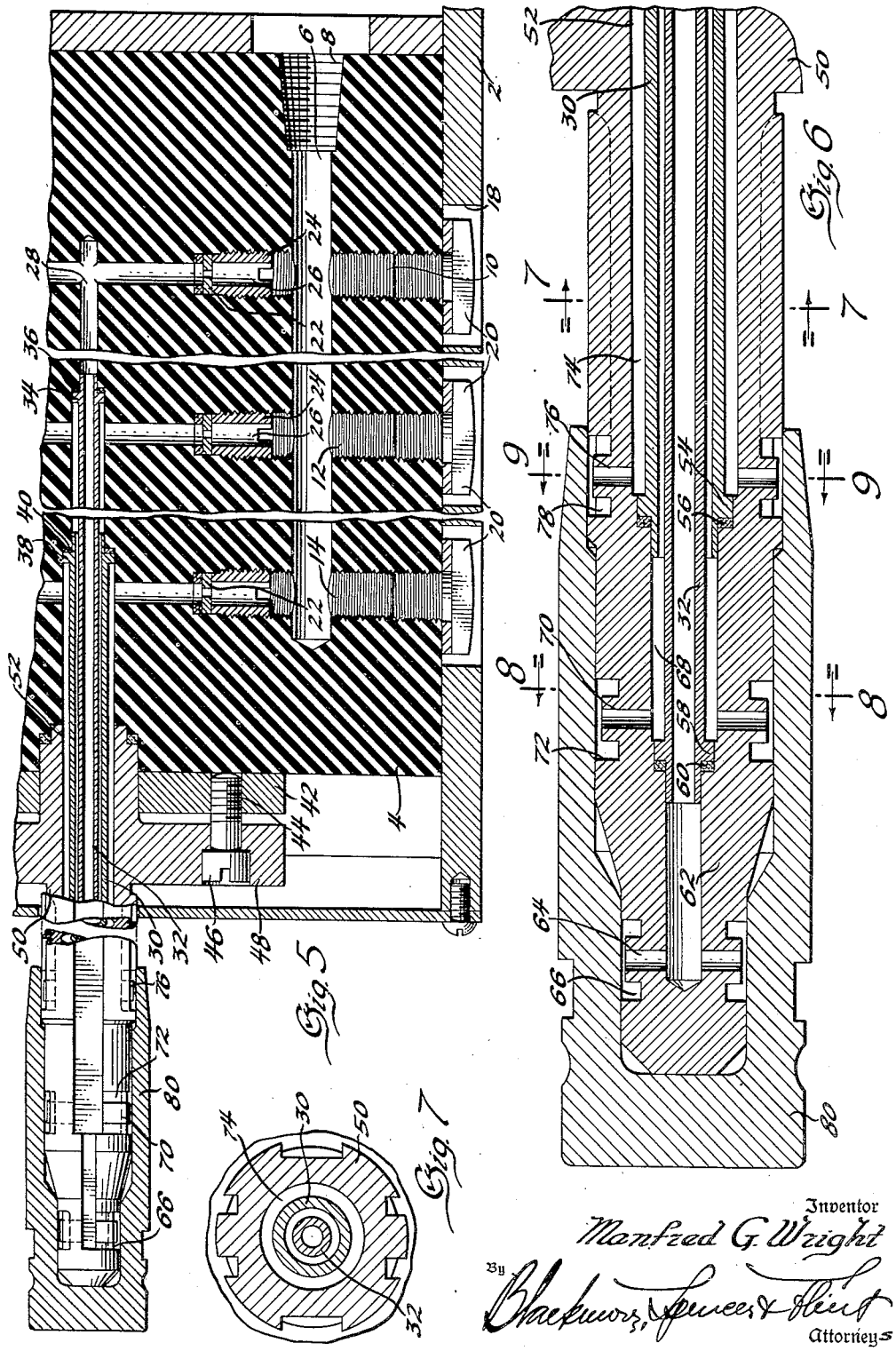

Patented Apr. 11, 1944

2,346,406

UNITED STATES PATENT OFFICE 2,346,406

GAUGE

Manfred G. Wright, Kokomo, Ind., assignor to General Motors Corporation, Detroit, Mich., a corporation of Delaware Application July 5, 1943, Serial No. 493,499

13 Claims. (Cl. 33—178)

This invention relates to gauging means and more particularly to automatic gauging means simultaneously checking a plurality of dimensions. In production where a large number of parts must be gauged accurately and rapidly, it has been common practice to check their dimensions with plug or ring gauges that may be utilized by unskilled labor. Each of these gauges can of course only be used for one particular dimension. There are many instances in which one part may have a plurality of dimensions which it is necessary to check and to use a plurality of ring or plug gauges separately to check each dimension would be impractical and in some cases impossible. In order to utilize rapid production methods, it is desirable under these circumstances to check a plurality of such dimensions on a single piece simultaneously.

It is therefore an object of my invention to provide means for checking a plurality of dimensions simultaneously.

It is a further object of my invention to provide means for simultaneously checking a plurality of dimensions along a major axis of a part.

It is a still further object of my invention to provide a gauging means for simultaneously gauging a plurality of dimensions and indicating points lying outside of the tolerance limits.

It is a still further object of my invention to provide a compound gauging means which can be easily, accurately operated by unskilled hands.

It is a still further object of my invention to provide a compound gauging means which may be easily adjusted to accommodate various dimensions in the pieces being checked.

It is a still further object of my invention to provide a compound gauging means utilizing both fluid pressure and electric means to check and obtain visual indications of dimensions.

With these and other objects in view which will become apparent as the specification proceeds, the embodiments of my invention will be best understood by reference to the following specification and claims and the illustrations in the accompanying drawings, in which:

Figure 4 is an enlarged, partial, vertical, sectional view through one of the pneumatic actuating units;

Figure 5 is an enlarged, vertical, sectional view through the lower portion of the gauge illustrating the paths of fluid flow;

Figure 6 is a sectional view taken through the test nozzle showing the test piece in position;

Figures 7, 8 and 9 are sectional views taken on lines 7—7, 8—8, and 9—9, respectively, of Figure 6; and Figure 10 is a top plan view of one of the switching elements operated by the pneumatic means.

Figure 1:
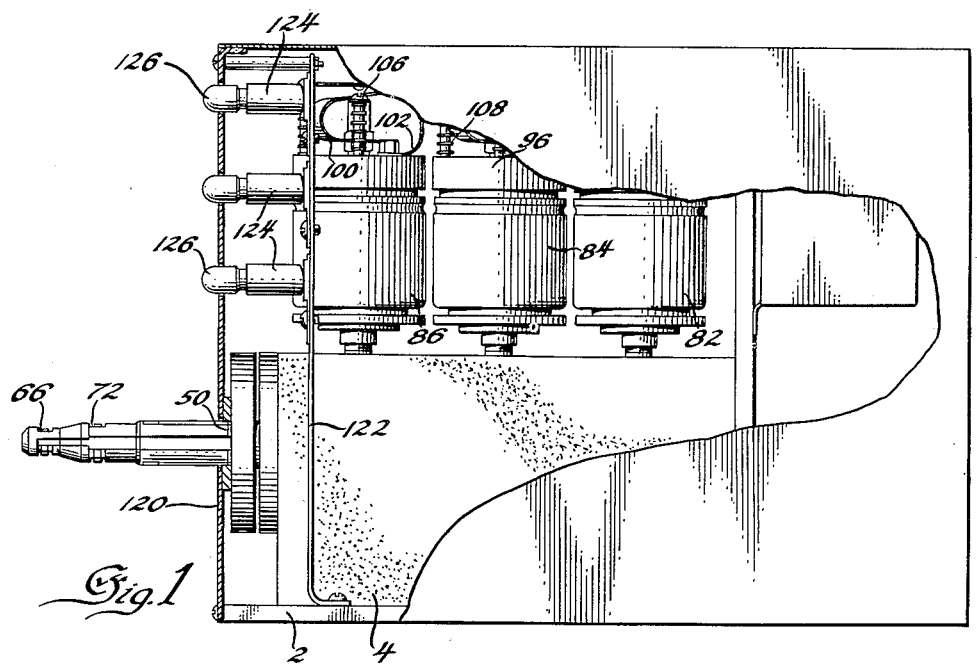
Figure 1 is a side elevation of a gauge embodying my invention, parts being broken away and shown in section.
Figure 2:
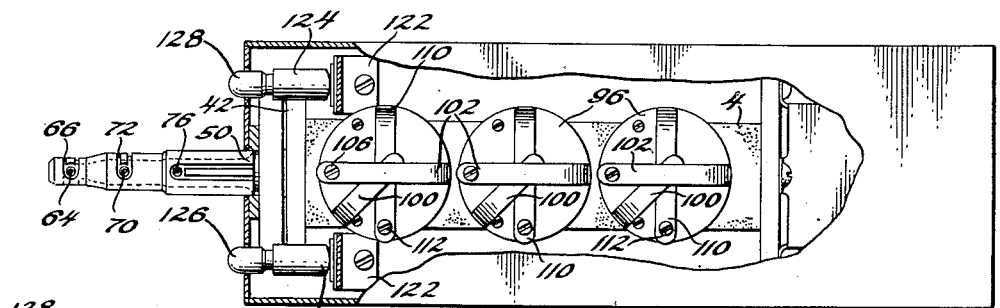
Figure 2 is a top plan view of the gauge shown in Figure 1, parts being broken away and shown in section.
Figure 3:
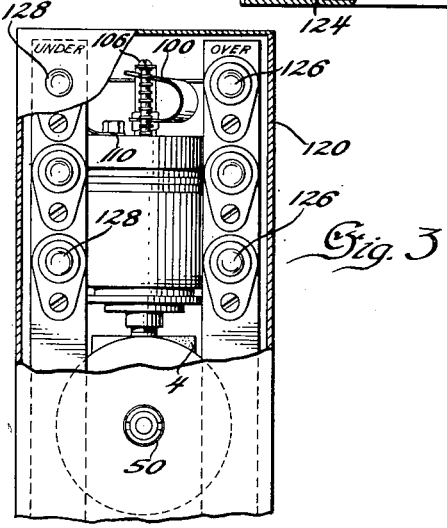
Figure 3 is a partial front view of the gauge shown in Figures 1 and 2, parts being broken away and shown in section.

Referring now more specifically to the drawings, there is shown in Figure 1 a base member 2 having mounted thereon a block 4 rigidly secured to the base by any suitable means. This block 4 has therein a longitudinal bore 6 extending substantially through the block and having its outer end tapped as shown at 8 for connection to a suitable source of fluid pressure such as compressed air. Intersecting this longitudinal bore 6 at right angles are a series of vertical ducts 10, 12 and 14, extending up from the bottom surface of the block 4, intersecting the bore 6, and for a certain distance therebeyond, at which point they decrease their diameter and extend thence through to the upper surface of the block 4 where they join with a tapped portion, such as 16, for the introduction of apparatus to be later described.

The base 2 has openings 18 therein adjacent each of these vertical ducts and in each of these openings is located a cap screw, such as 20, which is threaded into each of the ducts and seals the same against loss of fluid pressure and at the same time permits access into the duct for regulation of metering or master orifices enclosed in the upper portion of the enlarged section of the ducts previously referred to. These ducts 10, 12, and 14 are threaded throughout their length and at the upper end of each there is clamped a replaceable master or metering orifice 22 which is held in place by a suitable hollow set screw 24 having a central duct 26 therein. Each of these metering orifices is adapted to permit a certain predetermined flow of air therethrough into the ducts beyond and therefore pressure therein. A second substantially horizontal duct 28 of progressively increasing diameter toward the left in Figure 5 interconnects with each of the vertical ducts 10, 12 and 14 and contains therein a plurality of concentric tubes 30 and 32 whose diameters are substantially different so as to cause the exterior diameter of the inner tube 32 to be spaced from the internal diameter of the tube 30 and thus provide a duct therebetween.

The inner end of the tube 32 has an enlarged flange 34 spaced back from the end thereof which is adapted to press against a small packing washer 36 to seal the joint, the projecting end of the tube 32 extending into the smallest diameter of the duct 28. In like manner the inner end of the tube 30 has an enlarged flange 38 which clamps a small packing washer 40 between its surface and a second shoulder at the next enlarged step of the duct 28, the projecting end of the tube 30 extending for a short distance into the second larger diameter of the duct 28. In this manner there are provided three channels for the flow of air or other fluid under pressure through these two assemblies, one channel being through the internal diameter of the smaller tube 32, a second channel through that space provided between tube 32 and tube 30, and, lastly, a space provided around the external diameter of the tube 30 and the inner wall of the largest section of the duct 28.

Secured to the forward face of the block 4 by any suitable means is a plate 42 which has therein suitable tapped openings 44 into which are threaded cap screws 46 for supporting an enlarged flange 48 of a nozzle member 50. This nozzle member has a central duct 52 therein similar to duct 28 in the block 4 in that there are a series of sections therein of different internal diameter. In this instance, however, the internal diameter decreases, proceeding toward the left in Figure 6, or toward the outer nose of the nozzle. The outer end of the larger tube 30 is flanged at a point back from its exterior end to provide a locking flange 54 which compresses a sealing washer 56 against an internal shoulder in the nozzle and the outer end of the smaller tube 32 is likewise provided with a shoulder 58 which seals a small washer 60 against a second shoulder within the duct. As before, the extreme ends of both of these tubes project for a short distance into the smaller diameters of the duct 52.

The projecting or exterior end of the nozzle 50 therefore has a chamber 62 provided in the end of the duct 52 across which there is a transverse duct 64 whose ends are open to the atmosphere. There are also provided in proximity to those openings in the end of duct 64 a series of annular grooves 66 therein whose purpose will be later explained. In like manner, a chamber 68 is provided at the intermediate portion of the nozzle between the ends of the tube 30 and the shoulder 58 on the tube 32. A transverse channel 70 interconnects this chamber 68 with the exterior of the nozzle and a series of annular grooves 72 are provided in the periphery adjacent the exterior ends of the duct 70. The innermost portion of the nozzle, or that adjacent the block, has an annular chamber 74 therein around the exterior surface of the larger tube 30 which is interconnected with a transverse duct 76 extending to the exterior surface of the nozzle and cooperating with a series of grooves 78 on the exterior surface of the nozzle proper. All of these chambers and transverse ducts are provided so that air may escape through these different paths to the atmosphere, this being a gauging means in which the amount of air so escaping is gauged by the proximity of a piece to be tested in the manner disclosed in the Rupley Patent 2,306,469, issued December 29, 1942. As the dimension in such a test part differs from the correct dimension, more or less air will be allowed to escape when the piece is brought into proximity with the gauging means, and such difference in escaping fluid will alter the air pressure at a predetermined point in the gauging means, which pressure differential can be shown on provided indicating means.

In Figure 6 the test piece 80 is shown in position over the testing nozzle and it will be clear therefrom that this piece to be tested has a plurality of different internal diameters which cooperate with the different external diameters and ends of the transverse ducts of the nozzle as previously described. Thus, as more or less air is permitted to escape from transverse duct 64, this will indicate the internal diameter of the smaller part of the bore in the member 80, and in like manner the air escaping from duct 70 will give a gauge indication of the intermediate diametral portion, and that escaping from duct 76 that of the largest internal bore. The grooves 66, 72 and 78 which are provided adjacent the external ends of these transverse leakage ducts are provided so that the ends of the ducts per se will not be in contact or nearly so with the surface, but the air may emerge from the same into the circular grooves and leak out at any point in its circumference.

Referring now more particularly to the indicating means, it will be noted that each of the vertical ducts 10, 12 and 14 is connected into chambers connecting with portions of the gauging nozzle, which chambers will of course have a pressure determined by the amount of air leaking from the various gauging nozzle ducts. On the upper end of each of these vertical ducts there is secured a pressure sensitive device such as 82, 84 and 86, respectively, in which is mounted a bellows 88 which is affected by the pressure within the chamber and which therefore moves a vertical stud 90 in each instance to different predetermined heights depending upon the pressure. The upper projecting end of this stud 90 which is moved by the bellows projects through an opening 92 in a distortable plate 94 and is clamped thereto by nuts on opposite sides of the plate. This plate is rigidly secured to the housing surrounding the bellows means and therefore forms a resilient support for the stud. The member 96 clamping this disc to the housing is formed of insulating material and has likewise a central opening 98 through which the end of the stud passes.

The ultimate projecting end of each stud has clamped thereon a U-shaped bowed contact member 100 whose upper end operates as a movable switch member for purposes to be described. The supporting member 96 carries a second and larger bowed spring contact 102 which has its lower end rigidly secured to the member 96 by a cap screw 104 and has its upper end adjustable in height through an elongated screw member 106 which projects through the end of the member 102 tending to pull it down toward the member 96. A concentric coil spring 108 extends between the lower surface of the upper end of the member 102 and the upper surface of the supporting member 96 to maintain the member 102 in contact with the head of the screw. Likewise supported at right angles to the bent spring contact 102 is a second and similar contact 110 also mounted on the upper surface of the member 96 forming a smaller loop and having its upper adjustable end mounted under a similar adjusting screw 112 and held in contact therewith by a coiled concentric spring 114.

The difference in the height attained by these two spring contact members is to provide a certain intervening space into which projects the upper end of the U-shaped contact member 100, there being a sufficient distance between the two so that this contact member may oscillate back and forth making contact with one or the other for certain desired switching. As will be obvious from the prior description, by merely adjusting the screw 106 or 112 the heights of the ends of the two, and therefore the heights of the contact means 116 and 118 carried thereby, can be accurately adjusted. Thus when the pressure in the bellows changes, the stud 90 will be moved either up or down, depending upon the change in pressure, to bring the contact member 100 into contact with either member 116 or 118. If the pressure changes sufficiently to permit such contact, a circuit will be closed to an indicating lamp which will indicate either undersize or oversize. If the pressure change is not sufficient to permit this closure, then the piece is within specified limits. Therefore pressure sensitive means 82, 84 and 86 permits separate switching for the pressure which is provided by the leakage of air from test ducts 64, 70 and 76.

Surrounding this mechanism is an enclosing case 120 which is secured to the base and extends up to totally enclose the equipment previously described. Mounted upon a bracket 122 in the upper part of the forward section of the case are a series of electrical sockets 124 which are adapted to support small indicating lamps 126 and 128 in two groups along opposite sides of the casing. The number of lamps in each group depends upon the number of dimensions it is desired to gauge with the means, those on one side of the casing indicating undersize and those on the opposite side oversize. Suitable electrical connections (not shown) would, of course, be provided from all of the upper spring contacts 116 to one series of lamps and all of the lower spring contacts 118 to the other series of lamps, the opposite side of the power source being connected to the oscillating contact 100 and the other side of each socket.

Thus when a complex member such as 80 is applied over the gauging nozzle whose configuration may of course be changed to accommodate different members, a certain amount of air will flow from the supply through duct 6, duct 10, master orifice 22, duct 26, the inner channel of the tube 32 through to the forward end of the testing nozzle and tend to emerge from the cross duct 64, the amount of air actually escaping from this port being determined by the closeness of the fit of the test piece over this portion of the nozzle. This amount of escaping fluid therefore determines the pressure within the smaller portion of the duct 28 and therefore in that portion of the upper end of the duct 10 to cause the pressure sensitive unit 82 to assume some position. If in the assumption of this position the movable spring contact 100 of this unit contacts either contact 116 or contact 118, then one of the lights 126 of the oversize group will be lit or one of the bulbs 128 of the undersize group, depending upon which one is contacted. If the piece is of the proper size, then the pressure sensitive means will cause the movable contact member to assume an intermediate position and neither light will light. At the same time of course the same operation is being performed by gauging through the cross duct 70 and 76 to simultaneously gauge two further internal dimensions of the test piece 80 and if either one of these is not of the proper size, one of the other lamps will be energized. If the piece is exactly correct, no lights will light and the operator will know that it falls within tolerance. If a test piece of different configuration is desired to be tested, the nozzle may be removed and a different one corresponding to the new piece may be applied and at the same time the contacts 116 and 118 may be adjusted to conform to the new tolerance limits and the gauge mechanism is then ready to proceed with the checking of different sizes.

I claim:

1. In gauging means, a base, a member having a series of intersecting ducts therein, projectable means carried by the member and connected to a portion of the ducts, said projectable means having a plurality of means for gauging different dimensions, a plurality of pressure actuated means connected to others of said ducts and indicating means carried by the base operated by said pressure actuated means.

2. In gauging means, a member having a plurality of intersecting ducts, one of which is formed of a series of sections of step-by-step increasing diameters, a hollow projectable means supported on the member at the terminus of the vari-diameter duct, said means likewise having stepped internal diameters, a plurality of concentric means interconnecting ducts of like diameter in the member and means whereby a plurality of parallel channels are provided from the member into the means.

3. In gauging means, a member having a plurality of intersecting ducts, one of which is formed of a series of sections of step-by-step increasing diameters, a hollow projectable means supported on the member at the terminus of the vari-diameter duct, said means likewise having stepped internal diameters, a plurality of concentric means interconnecting ducts of like diameter in the member, means whereby a plurality of parallel channels are provided from the member into the means, and ducts extending from each duct of different diameter in the projecting means to the atmosphere to permit fluid pressure therein to vent.

4. In gauging means, a support having a plurality of separate channels interconnecting with a single channel, flow metering means in each of said separate channels, gauging means carried by said support having a plurality of gauging ducts, means interconnecting each of the gauging ducts with one of the separate channels having metered flow whereby a plurality of dimensions may be gauged simultaneously.

5. In gauging means, a support having a plurality of separate channels interconnecting with a single channel, flow metering means in each of said separate channels, gauging means carried by said support having a plurality of gauging ducts, means interconnecting each of the gauging ducts with one of the separate channels having metered flow whereby a plurality of dimensions may be gauged simultaneously, pressure responsive means mounted on said support and connected to the separate channels and indicating means actuated by said pressure responsive means.

6. In gauging means, a support having a plurality of separate channels interconnecting with a single channel, flow metering means in each of said separate channels, gauging means carried by said support having a plurality of gauging ducts, means interconnecting each of the gauging ducts with one of the separate channels having metered flow whereby a plurality of dimensions may be gauged simultaneously, pressure responsive means mounted on said support and connected to the separate channels, switching means operated by the pressure responsive means and indicating means controlled by the switching means whereby a plurality of dimensions may be gauged simultaneously and indications given.

7. In gauging means, a support having a plurality of separate channels interconnecting with a single channel, flow metering means in each of said separate channels, gauging means carried by said support having a plurality of gauging ducts, means interconnecting each of the gauging ducts with one of the separate channels having metered flow whereby a plurality of dimensions may be gauged simultaneously, pressure responsive means mounted on said support and connected to the separate channels, limit switches operated by each pressure responsive means to indicate oversize and undersize for each dimension, and indicating means actuated by the switching means.

8. In gauging means, a support having a plurality of separate channels interconnecting with a single channel, flow metering means in each of said separate channels, gauging means carried by said support having a plurality of gauging ducts, means interconnecting each of the gauging ducts with one of the separate channels having metered flow whereby a plurality of dimensions may be gauged simultaneously, pressure responsive means mounted on said support and connected to the separate channels, limit switches operated by each pressure responsive means to indicate oversize and undersize for each dimension, and a pair of illuminable means connected to each set of limit switches.

9. In gauging means utilizing the principle of fluid escape from an orifice through a space created by a member being tested, a support having a plurality of separate channels therein, flow metering means for controlling the pressure in each channel, a hollow gauging member carried by the support having a plurality of ducts extending from the interior to the surface for gauging purposes and means for separately connecting the separate channels in the support to the gauging ducts.

10. In gauging means utilizing the principle of fluid escape from an orifice through a space created by a member being tested, a support having a plurality of separate channels therein, flow metering means for controlling the pressure in each channel, a hollow gauging member carried by the support having a plurality of ducts extending from the interior to the surface for gauging purposes and a plurality of concentric tubes forming parallel separate paths interconnecting said separate channels and said gauging ducts.

11. In gauging means utilizing the principle of fluid escape from an orifice through a space created by a member being tested, a support having a plurality of separate channels therein, flow metering means for controlling the pressure in each channel, a hollow gauging member carried by the support having a plurality of ducts extending from the interior to the surface for gauging purposes, means for separately connecting the separate channels in the support to the gauging ducts, pressure responsive means carried by the support and connected into the separate channels to be actuated by the fluid pressure therein, and indicating means operated by said pressure responsive means.

12. In gauging means utilizing the principle of fluid escape from an orifice through a space created by a member being tested, a support having a plurality of separate channels therein, flow metering means for controlling the pressure in each channel, a hollow gauging member carried by the support having a plurality of ducts extending from the interior to the surface for gauging purposes, means for separately connecting the separate channels in the support to the gauging ducts, pressure responsive means carried by the support and connected into the separate channels to be actuated by the fluid pressure therein, switching means operated by said pressure responsive means and indicating means controlled by said switching means.

13. In gauging means utilizing the principle of fluid escape from an orifice through a space created by a member being tested, a support having a plurality of separate channels therein, flow metering means for controlling the pressure in each channel, a hollow gauging member carried by the support having a plurality of ducts extending from the interior to the surface for gauging purposes, means for separately connecting the separate channels in the support to the gauging ducts, pressure responsive means carried by the support and connected into the separate channels to be actuated by the fluid pressure therein, adjustable spaced switching means mounted adjacent each pressure responsive means actuated at different positions of the pressure actuated means and indicating means controlled by the switching means whereby the position of the pressure responsive means will determine the switching control for the indicating means.

MANFRED G. WRIGHT.